(12) United States Patent
Xiong et al.

(10) Patent No.: US 8,407,755 B2
(45) Date of Patent: Mar. 26, 2013

(54) CONTROL OF IPTV USING SECOND DEVICE

(75) Inventors: True Xiong, San Diego, CA (US);
Charles McCoy, San Diego, CA (US);
Leo M. Pedlow, Ramona, CA (US);
Ling Jun Wong, Escondido, CA (US)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 12/844,205

(22) Filed: Jul. 27, 2010

(65) Prior Publication Data
US 2012/0030701 A1    Feb. 2, 2012

(51) Int. Cl.
*H04N 7/173* (2011.01)
(52) U.S. Cl. .................. 725/131; 725/116; 725/109
(58) Field of Classification Search ............ 725/85, 725/86, 91, 93, 98, 100, 105, 109, 110, 114, 725/116, 118, 119, 131
See application file for complete search history.

(56) References Cited

U.S. PATENT DOCUMENTS

| | | | |
|---|---|---|---|
| 6,374,402 | B1 | 4/2002 | Schmeidler et al. |
| 7,380,280 | B2 | 5/2008 | De Jong |
| 7,454,622 | B2 | 11/2008 | Laidlaw et al. |
| 7,669,213 | B1 | 2/2010 | Wick et al. |
| 7,895,445 | B1 | 2/2011 | Albanese et al. |
| 7,913,309 | B2 | 3/2011 | Starostin et al. |
| 8,001,585 | B2 | 8/2011 | Hogan et al. |
| 8,082,591 | B2 | 12/2011 | Gu et al. |
| 2002/0104099 | A1 | 8/2002 | Novak |
| 2004/0008972 | A1 | 1/2004 | Haken |
| 2004/0237100 | A1 | 11/2004 | Pinder et al. |
| 2005/0086683 | A1 | 4/2005 | Meyerson |
| 2005/0108519 | A1 | 5/2005 | Barton et al. |
| 2006/0212531 | A1 | 9/2006 | Kikkawa et al. |
| 2007/0006277 | A1 | 1/2007 | Mills et al. |
| 2007/0061858 | A1 | 3/2007 | Ura |
| 2007/0256118 | A1 | 11/2007 | Nomura et al. |
| 2008/0155614 | A1 | 6/2008 | Cooper et al. |
| 2008/0183815 | A1 | 7/2008 | Unger |
| 2008/0200148 | A1 | 8/2008 | Fink |
| 2008/0244658 | A1 | 10/2008 | Chen |
| 2009/0007187 | A1 | 1/2009 | Koul |
| 2009/0052863 | A1 * | 2/2009 | Parmar et al. ............ 386/83 |
| 2009/0158330 | A1 | 6/2009 | Song et al. |

(Continued)

FOREIGN PATENT DOCUMENTS

JP      2008035108      2/2008
WO     2009022869      2/2009

(Continued)

OTHER PUBLICATIONS

Ignacio Mas, Viktor Berggren, Rittwik Jana, John Murray, Christopher V. Rice: "IPTV Session Mobility", Jun. 12, 2009.

(Continued)

*Primary Examiner* — John Schnurr
(74) *Attorney, Agent, or Firm* — John L. Rogitz

(57) ABSTRACT

An IPTV may be controlled in part by a second user consumer electronic (CE) device such as a personal digital assistant (PDA) or laptop computer. The IPTV obtains system credentials from a management server to access multiple content servers, and the second CE device can browse Internet content available to the IPTV by accessing a proxy server, which coordinates with the management server and content serves to obtain necessary credentials and information for the second CE device.

11 Claims, 3 Drawing Sheets

U.S. PATENT DOCUMENTS

| | | | |
|---|---|---|---|
| 2009/0164786 A1* | 6/2009 | Sekimoto et al. | 713/171 |
| 2009/0180614 A1 | 7/2009 | Rajagopal et al. | |
| 2009/0210552 A1 | 8/2009 | Ozugur et al. | |
| 2009/0216806 A1 | 8/2009 | Feuerstein et al. | |
| 2009/0222874 A1 | 9/2009 | White et al. | |
| 2009/0271826 A1 | 10/2009 | Lee | |
| 2009/0282236 A1 | 11/2009 | Hallenstal et al. | |
| 2009/0293078 A1 | 11/2009 | Pirani et al. | |
| 2009/0299543 A1 | 12/2009 | Cox et al. | |
| 2010/0011391 A1 | 1/2010 | Carpenter et al. | |
| 2010/0027441 A1 | 2/2010 | Curtis et al. | |
| 2010/0080163 A1 | 4/2010 | Krishnamoorthi et al. | |
| 2011/0010433 A1 | 1/2011 | Wilburn et al. | |
| 2011/0023069 A1 | 1/2011 | Dowens | |
| 2011/0106718 A1 | 5/2011 | Robert et al. | |
| 2011/0107382 A1 | 5/2011 | Morris et al. | |
| 2011/0173651 A1 | 7/2011 | Perry, II | |
| 2011/0209188 A1* | 8/2011 | Petersson et al. | 725/110 |

FOREIGN PATENT DOCUMENTS

| | | |
|---|---|---|
| WO | 2009052650 | 4/2009 |
| WO | 2009057965 | 5/2009 |

OTHER PUBLICATIONS

CATR/MII, "IPTV Security Requirements", International Telecommunications Union, FG IPTV-ID-0051, Jul. 10-14, 2006.

UTStarcom, "Architecture Requirement for IPTV Authentications", International Telecommunications Union, FG IPTV-ID-0073, Jul. 10-14, 2006.

True Xiong, Charles McCoy, Viral Mehta, Leo Pedlow, Aran Sadja, "Enablement of Premium Content for Internet Video Client" related U.S. Appl. No. 12/844,312, non-final office action dated Nov. 2, 2012.

True Xiong, Charles McCoy, Viral Mehta, Leo Pedlow, Aran Sadja, "Enablement of Premium Content for Internet Video Client" related U.S. Appl. No. 12/844,312, applicants response non-final office action filed Nov. 12, 2012.

True Xiong, Charles McCoy, Viral Mehtra, Leo Pedlow, Aran Sadja, "Enablement of Premium Content for Internet Video Client", co-pending U.S. Appl. No. 12/844,283, non-final office action dated Aug. 6, 2012.

True Xiong, Charles McCoy, Viral Mehtra, Leo Pedlow, Aran Sadja, "Enablement of Premium Content for Internet Video Client", co-pending U.S. Appl. No. 12/844,283, Applicants response to non-final office action filed Aug. 21, 2012.

True Xiong, Leo Pedlow, "Provision of TV ID to Non-TV Device to Enable Access to TV Services", co-pending U.S. Appl. No. 12/788,620, final office action dated Oct. 3, 2012.

Abhishek Patil, Xiangpeng Jing, DJ Nguyen, "Internet TV Content Sharing and Revenue Generation Using Buddy Lists and Short Messages" co-pending U.S. Appl. No. 12/839,529, final office action dated Oct. 9, 2012.

* cited by examiner

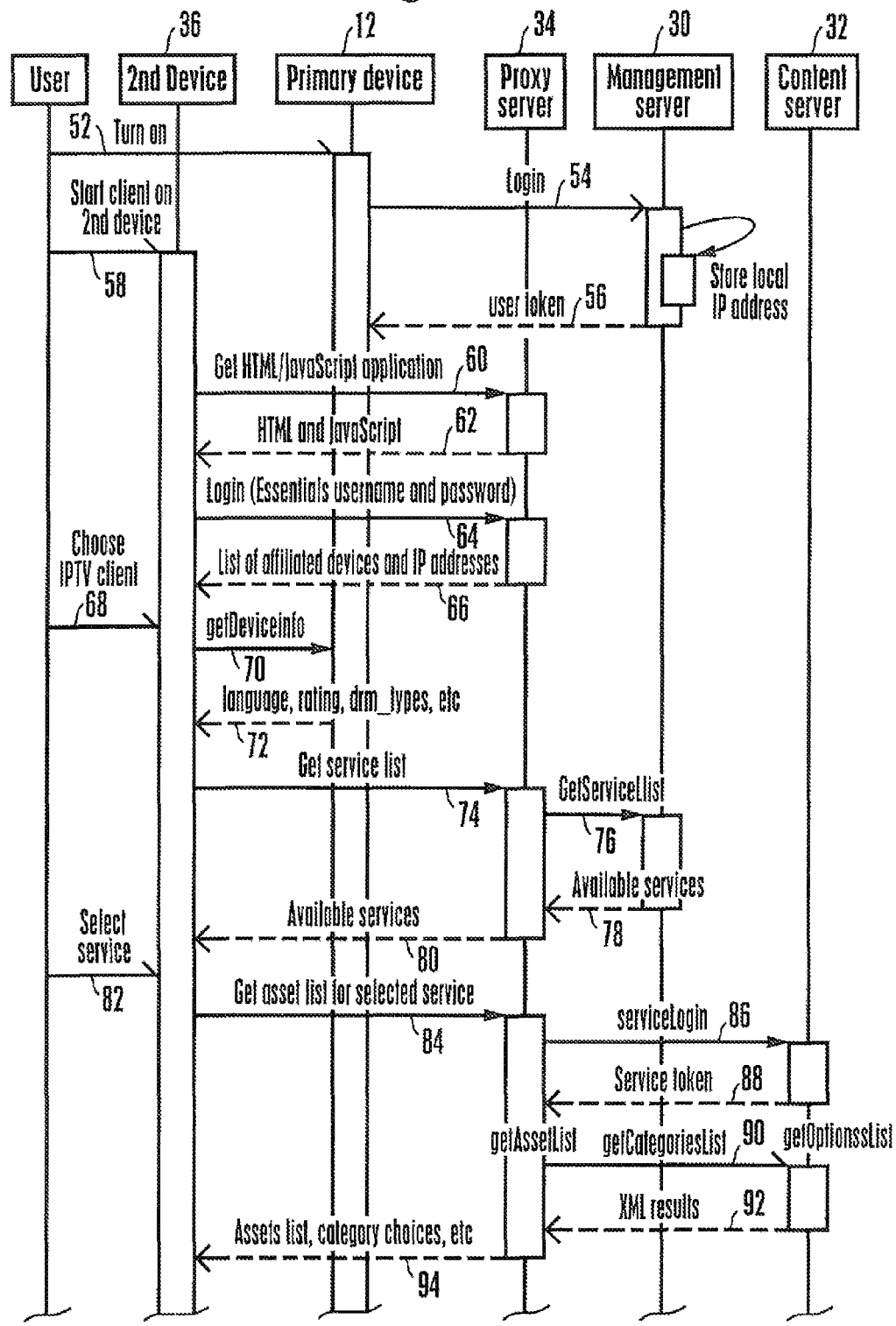

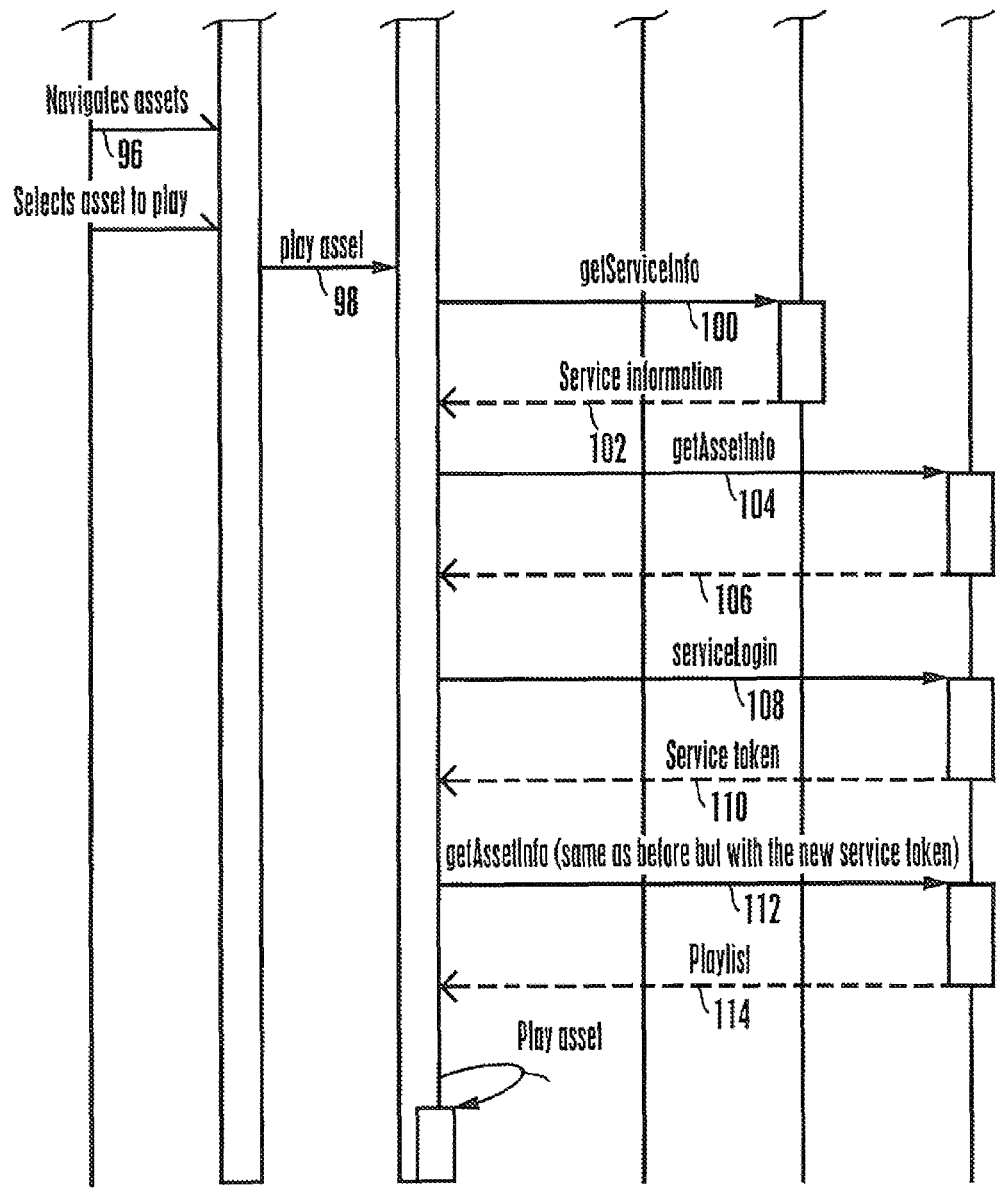

CONTROL OF IPTV USING SECOND DEVICE

FIELD OF THE INVENTION

The present application relates generally to controlling an IPTV using a second device.

BACKGROUND OF THE INVENTION

Internet access through TVs is typically provided by essentially programming the TV (often referred to as an Internet Protocol TV, or IPTV) as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet, such as, e.g., might be derived, as understood herein, by pay-per-view based on one or more options.

As further recognized herein, a user might happen to want to control an IPTV using a second device while the IPTV is executing its usual functions. This may be, e.g., because the second device has a convenient user interface or user input device, or because a second person may wish to browse Internet content available to the IPTV while another person is watching or otherwise controlling the IPTV.

SUMMARY OF THE INVENTION

According to present principles, a user can exploit a second device to view, browse and navigate data service offerings by service providers on an IPTV system and have a main IPTV client play the selected offerings.

Accordingly, a system is disclosed for enabling a user to use a control device to browse assets and select an asset to have a main Internet Protocol TV (IPTV) client play the content. In one aspect the system includes an Internet Protocol TV (IPTV) client device including an IPTV client processor controlling a video display to present content thereon. The system also includes a control device including a control processor and a management server communicating with the IPTV client over the Internet. The management server and IPTV client communicate with at least one content server such that the content server provides audio video content to the IPTV client for presentation of the content on the video display of the IPTV client. The system further includes a proxy server communicating with the management server and the control device.

The IPTV client sends login information to the management server which returns to the IPTV client a user token that must subsequently be presented by the IPTV client to a the content server to obtain content from the content server. The management server receives and stores a local IP address of the IPTV client. Responsive to the control device sending a request to the proxy server for an executable utility, the proxy server returns the utility to the control device. Further, the control device, executing the utility, prompts a user to input to the control device login information. The proxy server, responsive to reception of correct login information from the control device, returns the local IP address of the IPTV client to the control device. In turn, the control device uses the local IPTV address to access the IPTV client directly to request information about the IPTV client, which information is returned from the IPTV client to the control device such that the local address of the IPTV client need not be globally addressable. Also the control device sends the information about the IPTV client to the proxy server, requesting a list of services available to the IPTV client from one or more content servers. The proxy server relays the request for a list of services to the management server, which returns the list to the proxy server, with the proxy server in turn sending the list to the control device for presentation of information on the video display. Responsive to a user selection of an element on the list, the control device sends a request for a software asset corresponding to the element to the proxy server. The proxy server requests a service login of the content server providing the asset, and the content server provides to the proxy server a list of assets or categories or services which relays the list to the control device, which is presented on the video display of the control device so that the user can navigate to enter a selection. Responsive to the selection the control device sends a command to the IPTV client to play the selection.

In some embodiments the IPTV client requests of the management server information about the selection received from the control device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a service login received from the control device may be sent by the IPTV client to the content server and a service token returned to the IPTV client in response.

In another aspect, a consumer electronic (CE) control device includes a housing holding a display, a network interface, and a processor controlling the display and communicating with the Internet through the network interface. An input device communicates with the processor. The processor executing logic including sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

In another aspect, a proxy server assembly includes at least one processor and at least one network interface communicating with the processor to establish communication between the processor and a wide area network. At least one computer readable storage medium is accessible to the processor and bears logic causing the processor to receive login information from a control device. Responsive to a determination that the login information is correct, the server sends to the control device a local IP address of an IPTV client associated with the login information. The server receives from the control device information about the IPTV client requesting a list of services available to the IPTV client from at least one content server and sends a request for the list of services to a management server. The proxy server receives from the management server the list and sends it to the control device for presentation of information on a video display thereof. The proxy server then receives from the control device a request for a software asset and responsive to the request for the software asset, requests a service login of the content server. The proxy server receives back from the content server a list of assets or categories or services and sends the list to the control device. In this way, the list can be presented on a video display of the control device so that a user can navigate to enter a selection to command the IPTV client to play the selection.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart of example logic according to present principles.

DETAILED DESCRIPTION OF THE PREFERRED EMBODIMENT

Figure 1:
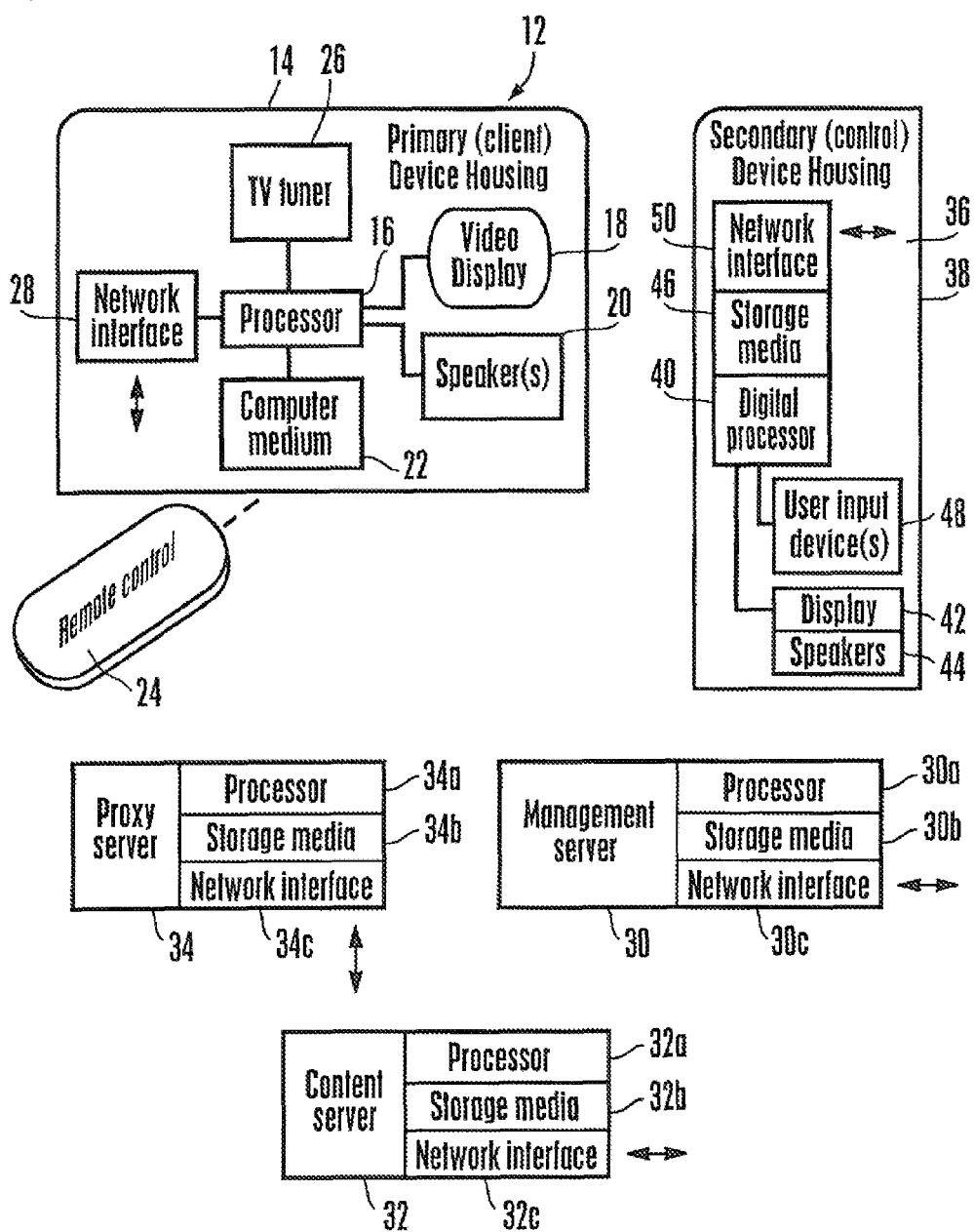
FIG. 1 is a block diagram of an example system in accordance with present principles.

Referring initially to FIG. 1, a client consumer electronics (CE) device 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers.

To undertake present principles, the processor 16 may access one or more computer readable storage media 22 such as but not limited to RAM-based storage (e.g., a chip implementing dynamic random access memory (DRAM)) or flash memory or disk-based-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30. If desired, each content server 32 may be associated with a respective proxy server 34 which interfaces the content server 32 with the device 12. The servers 30, 32, 34 have respective processors 30a, 32a, 34a accessing respective non-transitory computer readable storage media 30b, 32b, 34b which may be, without limitation, disk-based and/or solid state storage. The servers communicate with a wide area network such as the Internet via respective network interfaces 30c, 32c, 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

A second or control CE device 36 with housing 38 such as another TV, game player, video disk player, camera, digital clock radio, mobile telephone, personal digital assistant, laptop computer, etc. bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM)) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

FIG. 2 shows an example embodiment of present principles for enabling a user to use a second device 36 to browse assets and select one to have a main IPTV 12 client play the content. FIG. 2 assumes that the user has already created an account with the management server 30 and has affiliated the main IPTV device with that account.

At state 52 a user turns on the primary device 12, hereafter referred to as the "IPTV client" for convenience. At state 54 the IPTV client sends login information including, e.g., user name and password to the management server 30, which at state 56 returns to the IPTV client a user token that must subsequently be presented by the IPTV client to a participating content server 32 to obtain content from that server. Also, the management server 30 stores the local IP address of the IPTV client 12.

At state 58, the user instantiates an IPTV client control utility on the second device 36, referred to hereafter for convenience as the control device. The utility executed on the control device 36, at state 60, sends a GET request to the proxy server 34, which returns (62) hypertext markup language (HTML) with JavaScript for the control device 36 to execute in accordance with description below. This Javascript makes asynchronous Javascript and extended markup language (XML) (AJAX) calls to the proxy server and to the IPTV client to obtain information to control the IPTV client.

With more specificity, at state 64 using the Javascript received from the proxy server 34 the control device 36 prompts the user to input to the control device 36 the account login information, including, e.g., the same user name and password that the IPTV client provided to the management server 30 at 54. It will thus be appreciated that the servers 30, 32, 34 communicate necessary account information between them as needed to realize present principles.

At state 66 the proxy server 34, responsive to a correct user name and password from the control device 36, returns information about all IPTV clients 12 that are affiliated with the user account associated with the user name and password, including their local IP addresses which were stored by the management server 30 after login at 54 (and subsequently provided to the proxy server 34).

When the user inputs to the control device 36 at state 68 a selected IPTV client (in this example, the IPTV client 12) to use with the control device, the control device 36, using the local IP address returned at state 66, accesses the IPTV client 12 directly. The control device 36 requests information about the IPTV client 12 at state 70, including language information, rating information, digital rights management (DRM) information, etc. as desired, which information is returned from the IPTV client 12 to the control device 36 at state 72. Since the control device 36 knows the IP address of the IPTV client 12 and consequently communicates directly with the IPTV client 12, the control device 36 communicates using a local web address of the IPTV client 12 that need not be globally addressable, and may so communicate as long as the control device 36 and IPTV client 12 are on the same local network.

At state 74 the control device 36 sends the client information received at state 72 to the proxy server 34, requesting a list of services available to the IPTV client 12 from one or more of the content servers 32. The proxy server 34 relays the request at state 76 to the management server 30, which returns the requested service list at state 78 to the proxy server 34. The proxy server 34 in turn sends the services list to the control device 36 at state 80 for presentation of available services on, e.g., the control device display 42.

State 82 indicates that a user can input (using, e.g., the control device input device 48) a selection of a service on the list that was returned to the control device at state 80. In response, the control device 36, at state 84, sends a request for the corresponding software asset to the proxy server 34 along with a service token that the control device may have received from the content server 32 via the management server 30.

Responsive to the request, at state 86 the proxy server requests a service login at state 86 of the content server 32 providing the selected service. At state 88 the content server 32 provides to the proxy server 34 a list of assets or categories or services, as the case may be for the particular content server 32. State 90 indicates that if desired the proxy server 34 may also request of the content server 32 a list of options, and the list is returned at state 92 in, e.g., extended markup language (XML) format to the proxy server 34, which relays the assets, categories, services, etc. available for selection to the control device 36 at state 94.

The content available for selection is presented on the control device display 42 so that the user can navigate (96) the display to enter (98) a selection. Responsive to the selection the control device 36 at state 98 sends a command to the IPTV client 12 to play the selection. At state 100 the IPTV client 12 then requests of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content the new content commanded to be played by the control device is placed in a queue in the IPTV client and played when the current content completes.

Note further that the control device may command the IPTV client to play content by sending to the IPTV client over the home network commands coded as if they were sent from an infrared remote control (IR RC), specifically for example the commands may be in Sony Infrared Remote Control System (SIRCS) protocol.

As shown in FIG. 2, if desired, temporally between states 102 and 116 a series of messages may be exchanged between the IPTV client 12 and the content server 32. For example, asset information may be requested (104) by the IPTV client 12 and returned (106) by the content server 32. The above-described service login may be relayed by the IPTV client 12 to the content server 32 at state 108 and a service token returned to the IPTV client at state 110 along with the before-mentioned asset information. Also, a playlist may be requested by (112) and returned to (114) the IPTV client 12.

The Javascript/HTML software that is downloaded at state 62 can be make available to all electronic vendors who wish their users to be able to navigate, browse, and search IPTV content on a second device.

While the particular CONTROL OF IPTV USING SECOND DEVICE is herein shown and described in detail, it is to be understood that the subject matter which is encompassed by the present invention is limited only by the claims.

What is claimed is:

1. System for enabling a user to use a control device to browse assets and select an asset to have a main Internet Protocol TV (IPTV) client play the content, the system comprising:

Internet Protocol TV (IPTV) client device including an IPTV client processor controlling a video display to present content thereon;

control device including a control processor;

management server communicating with the IPTV client over the Internet, the management server and IPTV client communicating with at least one content server such that the content server provides audio video content to the IPTV client for presentation of the content on the video display of the IPTV client;

proxy server communicating with the management server and the control device;

wherein the IPTV client sends login information to the management server which returns to the IPTV client a user token that must subsequently be presented by the IPTV client to the content server to obtain content from the content server, the management server receiving and storing a local IP address of the IPTV client, further wherein responsive to the control device sending a request to the proxy server for an executable utility, the proxy server returns the utility to the control device, further wherein the control device executing the utility prompts a user to input to the control device login information, further wherein the proxy server, responsive to reception of correct login information from the control device, returns the local IP address of the IPTV client to the control device, further wherein the control device uses the local IPTV address to access the IPTV client directly to request information about the IPTV client, which information is returned from the IPTV client to the control device such that the local address of the IPTV client need not be globally addressable, further wherein the control device sends the information about the IPTV client to the proxy server, requesting a list of services available to the IPTV client from one or more content servers, further wherein the proxy server relays the request for a list of services to the management server, which returns the list of services to the proxy server, the proxy server in turn sending the list of services to the control device for presentation of information on the video display, further wherein responsive to a user selection of an element on the list of services, the control device sends a request for a software asset corresponding to the element to the proxy server, the proxy server requesting a service login of the content server providing the asset, further wherein the content server provides to the proxy server a list of assets or categories or services which relays the list to the control device, further wherein the list of assets or categories or services is presented on the video display of the control device so that the user can navigate to enter a selection, wherein responsive to the selection the control device sends a command to the IPTV client to play the selection.

2. The system of claim 1, wherein the IPTV client requests of the management server information about the selection received from the control device, the information being returned from the management server to the IPTV client to enable the IPTV client to play content associated therewith.

3. The system of claim 1, wherein the proxy server requests of the content server a list of options, and the list of options is returned to the proxy server.

4. The system of claim 1, wherein asset information is requested by the IPTV client and returned thereto by the content server.

5. The system of claim 1, wherein a service login received from the control device is sent by the IPTV client to the content server and a service token returned to the IPTV client in response.

6. Proxy server assembly comprising:
at least one processor;
at least one network interface communicating with the processor to establish communication between the processor and a wide area network;
at least one computer readable storage medium accessible to the processor and bearing logic causing the processor to:
receive login information from a control device;
responsive to a determination that the login information is correct, sending to the control device a local IP address of an IPTV client associated with the login information;
receiving from the control device information about the IPTV client requesting a list of services available to the IPTV client from at least one content server;
sending a request for the list of services to a management server;
receiving from the management server the list of services;
sending the list of services to the control device for presentation of information on a video display thereof;
receiving from the control device a request for a software asset;
responsive to the request for the software asset requesting a service login of the content server;
receiving from the content server a list of assets or categories or services; and
sending the list of assets or categories or services to the control device, whereby the list of assets or categories or services can be presented on a video display of the control device so that a user can navigate to enter a selection to command the IPTV client to play the selection.

7. The proxy server of claim 6, wherein responsive to receiving from the control device a request for an executable utility, the processor returns the utility to the control device, the utility being configured to prompt a user to input to the control device login information.

8. The proxy server of claim 6, wherein the IPTV client requests of the management server information about the selection received from the control device, the information being returned from the management server to the IPTV client to enable the IPTV client to play content associated therewith.

9. The proxy server of claim 6, wherein the processor of the proxy server requests of the content server a list of options, and the list of options is returned to the proxy server.

10. The proxy server of claim 6, wherein asset information is requested by the IPTV client and returned thereto by the content server.

11. The proxy server of claim 6, wherein a service login received from the control device is sent by the IPTV client to the content server and a service token returned to the IPTV client in response.

* * * * *